(12) United States Patent
Oosuga et al.

(10) Patent No.: US 6,445,145 B1
(45) Date of Patent: Sep. 3, 2002

(54) DISPLAY DEVICE

(75) Inventors: Satoshi Oosuga, Saitama; Hiroaki Kikuchi, Kanagawa, both of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/258,119

(22) Filed: Feb. 26, 1999

(30) Foreign Application Priority Data

Mar. 4, 1998 (JP) .......................................... 10-052200

(51) Int. Cl.[7] ................................................. G09G 1/04

(52) U.S. Cl. ............................... 315/382.1; 315/368.18

(58) Field of Search ............................... 315/382.1, 381, 315/368.18, 308, 370, 411; 313/409, 408

(56) References Cited

U.S. PATENT DOCUMENTS

| 4,045,742 | A | * | 8/1977 | Meehan et al. .............. 315/308 |
| 5,523,657 | A | * | 6/1996 | Kamei .................... 315/368.18 |
| 5,589,883 | A | * | 12/1996 | Ogino et al. ................. 315/381 |

* cited by examiner

*Primary Examiner*—Don Wong
*Assistant Examiner*—Thuy Vinh Tran
(74) *Attorney, Agent, or Firm*—Sonnenschein, Nath & Rosenthal

(57) ABSTRACT

A display device capable of removing a defocused beam spot on the focusing screen by obtaining the fluctuation of a focusing voltage following the fluctuation of a high-tension voltage. There is applied a DC voltage of a predetermined high-tension voltage. Also, there is supplied a dynamic focus (DF) correction waveform such as a parabolic waveform voltage or the like matched with horizontal and vertical deflections or the like, for dynamically controlling the focusing in accordance with the shape of the tubular surface of a cathode-ray tube or the like. Further, there is supplied a peak focus (PF) correction waveform voltage corresponding to the fluctuation of the high-tension voltage. The DF correction waveform and the PF correction waveform are added by an adder. An added signal from the adder is amplified by an amplifier to 600 to 800 Vp-p, for example. Further, the correction waveform thus added and amplified and the above-mentioned DC voltage are added by an adder, and this added voltage is applied to a focusing grid, e.g. fourth grid (G4) of the cathode-ray tube.

11 Claims, 7 Drawing Sheets

PRIOR ART   Beam Current

PRIOR ART   Fluctuation of
High-Tension
Voltage

PRIOR ART   Fluctuation of
Focusing
Voltage

DISPLAY DEVICE

BACKGROUND OF THE INVENTION

1. Field of the Invention

The present invention relates to a display device suitable for use with a television receiver, a display device or the like using a cathode-ray tube to perform a display or the like, for example. More particularly, this invention relates to a display device using a dynamic focusing circuit to cause a control waveform to follow a fluctuation of a load of a high voltage to thereby solve a problem of a defocusing occurred in the case such as a brightness is high or the like.

2. Description of the Related Art

Display devices such as a television receiver, a display device or the like using a cathode-ray tube to perform a display carry out a focusing control in order to properly focus a beam spot of emitted electron beam on a screen or tubular surface of the cathode-ray tube. FIG. 1 of the accompanying drawings is a schematic block diagram showing an example of a display device in which such a focusing control is effected according to the related art.

As shown in FIG. 1, there is applied a predetermined high-tension DC voltage 61 which will be described later on. Also, there is supplied a correction waveform 62, such as a parabolic waveform matched with horizontal and vertical deflections or the like, for dynamically controlling the focusing in response to a shape or the like of a tubular surface or screen of a cathode-ray tube 65 which will be described later on. This correction waveform 62 is amplified by an amplifier 63 to 600 to 800 Vp-p. The correction waveform 62 thus amplified and the above-mentioned DC voltage 61 are added by an adder 64, and an added voltage from the adder 64 is applied to the focusing grid, e.g. fourth grid (G4) of the cathode-ray tube 65.

Thus, the focusing is controlled in order to cause the beam spot of the emitted electron beam, for example, to be properly focused on the screen of the cathode-ray tube. In this case, the focus of the beam spot is dynamically controlled in response to the shape of the screen of the cathode-ray tube 65 or the like. In particular, in a cathode-ray tube having a flat display screen surface, the focusing is excellently controlled over the whole of the display screen surface.

However, such display devices encounter with the problems which follow:

(1) A beam spot is not properly focused at the portion such as a white character or the like in which a brightness increases rapidly; and (2) A blooming occurs in a white peak such as a window signal or the like.

A study of examined results with respect to such problems reveals that those problems are mainly caused by a waveform response characteristic of a focusing voltage.

Specifically, in the above-mentioned display device, i.e. the display device using a so-called conventional-type horizontal deflection high-voltage circuit, an arrangement shown in FIG. 2, for example, is used to generate the above-mentioned focusing voltage (high-tension DC voltage 61=FV). As shown in FIG. 2, a high-tension voltage (HV) is derived from one end 72 of a high-voltage secondary winding of a flyback transformer 71 which performs a horizontal deflection, for example, and a middle-tension voltage (MV) for generating a focusing voltage is derived from a middle tap 73 of this high-voltage secondary winding.

On the other hand, in the above-mentioned display device, it is intended to increase a peak brightness in order to improve a contrast and a brightness of a displayed image. In that case, in the above-mentioned display device, which employs the above-mentioned conventional-type horizontal deflection high-voltage circuit, it is frequently observed that a high-voltage regulation characteristic is not satisfactory. For example, when a signal such as the above-mentioned window signal whose high-voltage load current is large is inputted, a high-tension voltage (HV) value tends to be lowered considerably.

Then, in this case, if the high-tension voltage (HV) value is fluctuated, then the middle-tension voltage (MV) value for generating the above-mentioned focusing voltage also will be fluctuated. Specifically, if a beam current increases due to the window signal or the like as shown in FIG. 3A, for example, then the high-tension voltage (HV) value will be lowered considerably as shown in FIG. 3B (high-voltage fluctuation). Then, the middle-tension voltage (MV) value that is used to generate the focusing voltage also is fluctuated as shown in FIG. 3C, for example, (focusing fluctuation).

Here, if the fluctuated amount of the high-tension voltage (HV) and the fluctuated amount of the middle-tension voltage (MV) were fluctuated with a certain constant ratio, a phenomenon such as the above-mentioned defocusing would not occur. However, in actual practice, an integral time constant of a resistor R1 and a capacitor C1 exists in the high-tension voltage (HV) derived from one end 72 of the above-mentioned secondary winding, and an integral time constant of a resistor R2 and a capacitor C2 exists in the middle-tension voltage (MV) derived from the middle tap 73 of the secondary winding as shown in FIG. 2.

Then, in this case, comparing these integral time constants, we have:

$$R1*C1 >> R2*C2$$

As a result, most of the fluctuation of the middle-tension voltage (MV) to which the integral time constant (R2*C2) is applied is absorbed. Therefore, the fluctuation of the focusing voltage (FV) that follows the fluctuation of the high-tension voltage (HV) cannot be obtained so that the beam spot is unavoidably defocused on the focusing screen.

Incidentally, the capacitor C2 that generates the integral time constant of the above-mentioned focusing voltage (FV) is a DC blocking capacitor used when the correction waveform 62 used to dynamically control the above-mentioned focusing is superimposed upon the focusing voltage (FV) by the adder 64 shown in FIG. 1, for example. Then, in this case, since the signal of the correction waveform 62 is low from a standpoint of impedance, it can be considered that the capacitor C2 is grounded equivalently and is served as an integral capacitor.

The problem inherent in the display device according to the related art is that, when the beam current increases due to the window signal or the like, the fluctuation of the focusing voltage following the fluctuation of the high-tension voltage cannot be obtained, thereby resulting in the beam spot being defocused on the focusing screen.

SUMMARY OF THE INVENTION

In view of the aforesaid aspect, it is an object of the present invention to provide a display device in which a focusing voltage may be corrected in response to the fluctuation of a detected high-tension voltage after the fluctuation of the high-tension voltage was detected. According to this display device, there may be obtained the fluctuation of the focusing voltage following the fluctuation of the high-tension voltage to thereby remove the defocusing of the beam spot on the focusing screen.

According to an aspect of the present invention, there is provided a display device using a cathode-ray tube to perform a display. This display device comprises a control means for controlling a focusing voltage in response to the position of a beam spot on the tubular surface or screen surface of the cathode-ray tube and a correction means for detecting the fluctuation of the high-tension voltage applied to the cathode-ray tube and correcting a focusing voltage in response to the fluctuation of this detected high-tension voltage.

According to the display device of the present invention, without improving high-voltage regulations, the defocusing of a beam spot and a blooming caused in a white peak such as a window signal or the like may be improved considerably.

DESCRIPTION OF THE PREFERRED EMBODIMENTS

Figure 4:
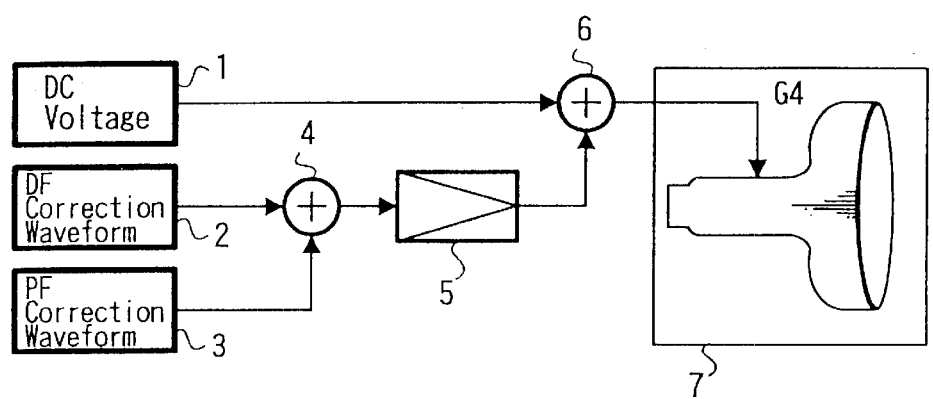
FIG. 4 is a schematic block diagram showing a display device according to an embodiment of the present invention.

The present invention will hereinafter be described with reference to the drawings. FIG. 4 is a block diagram showing a main portion of a display device according to an embodiment of the present invention.

Referring to FIG. 4, there is applied a predetermined high-tension DC voltage 1. Also, there is supplied a dynamic focus (DF) correction waveform 2, such as a parabolic waveform matched with horizontal and vertical deflections, for dynamically controlling the focusing in response to the tubular shape of a cathode-ray tube 7 which will be described later on or the like. Further, there is supplied a peak focus (PF) correction waveform 3 corresponding to the fluctuation of a high-tension voltage which will be described later on.

Then, the DF correction waveform 2 and the PF correction waveform 3 are added by an adder 4, and this added signal from the adder 4 is amplified by an amplifier 5 to 600 to 800 Vp-p, for example. Further, the correction waveform (2+3) thus added and amplified and the above-mentioned DC voltage 1 are added by an adder 6. This added voltage from the adder 6 is applied to the focusing grid, e.g. fourth grid (G4) of the cathode-ray tube 7.

Thus, there is carried out the focusing control in which, for example, the beam spot of an emitted electron beam is properly focused on the tubular surface or screen of the cathode-ray tube 7. Then, in this case, the focus of the beam spot is dynamically controlled in response to the shape of the screen of the cathode-ray tube 7 or the like. At the same time, this control waveform is corrected in response to the fluctuation of the high-tension voltage, thereby making it possible to remove the beam spot defocused on the focusing screen when the beam current increases due to the window signal or the like.

Figure 1:
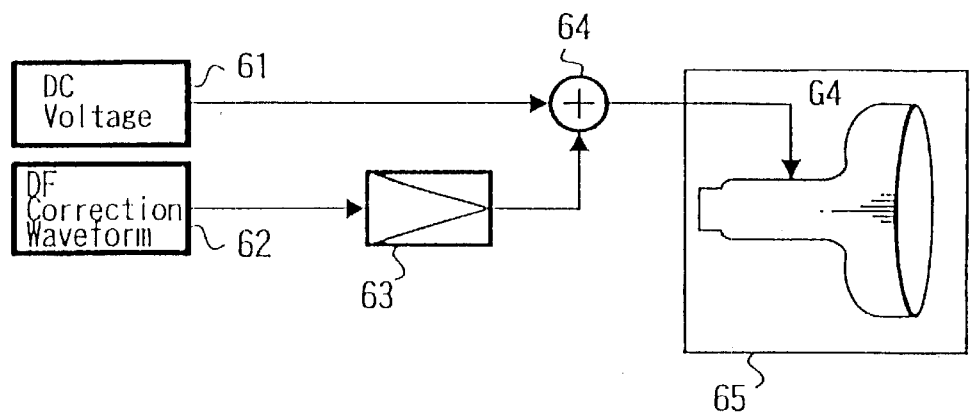
FIG. 1 is a schematic block diagram showing a conventional display device.
Figure 2:
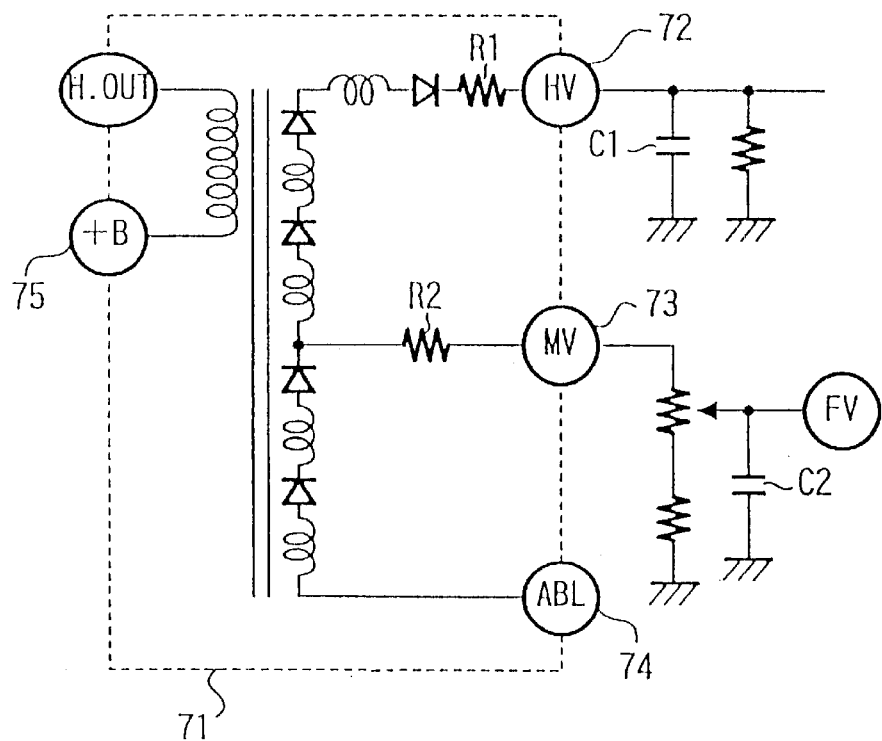
FIG. 2 is a schematic diagram showing a main portion of such a conventional display device shown in FIG. 1.
Figure 3A:
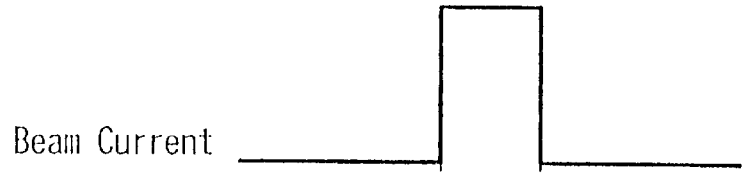
FIGS. 3A, 3B, 3C are respectively waveform diagrams used to explain the conventional display device shown in FIG. 1.
Figure 3B:
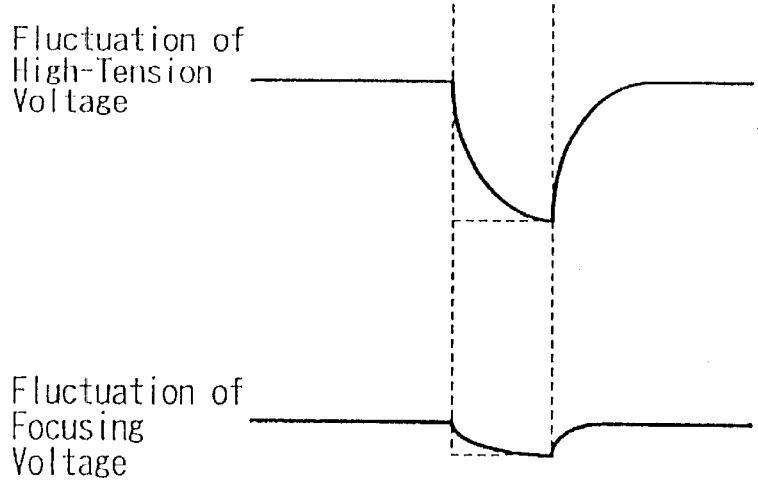
Figure 3C:

That is, in this display device, the cause in which the beam spot is defocused when the window signal, for example, is inputted is the integrating circuit comprised of the resistor R2 and the capacitor C2 as earlier noted with reference to FIG. 2. Due to the existence of this integrating circuit, a property in which the focusing voltage may follow the fluctuation of the high-tension voltage is deteriorated with the result that a focusing control amount decreases and that a phase-shift occurs.

Accordingly, in order to improve the defocusing caused when the window signal, for example, is inputted, it may be sufficient that the focusing control amount is increased and the phase is adjusted during only the period in which a high-tension load current is weighty, e.g. window signal period.

Figure 5:
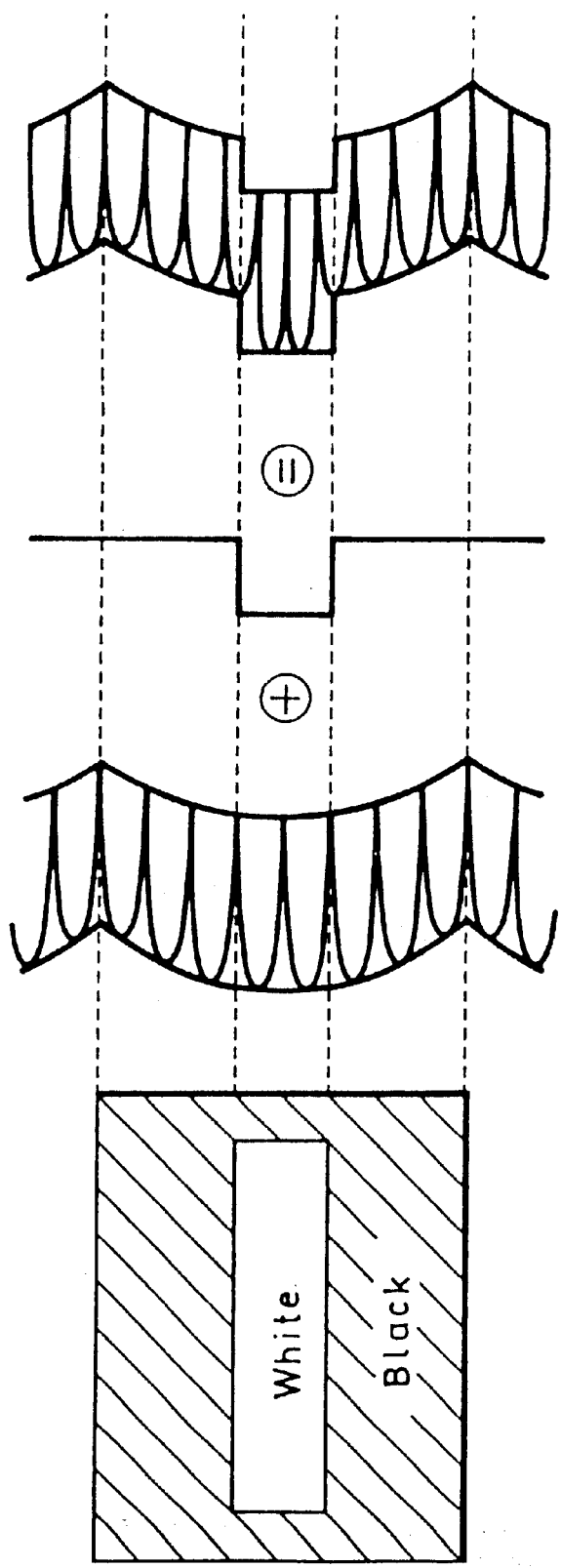
FIGS. 5A through 5D are respectively waveform diagrams used to explain an operation of the display device according to the present invention.

To this end, in the above-mentioned apparatus, when a white window is displayed on the black background as shown in FIG. 5A, for example, a fluctuation of a high-tension voltage obtained at that time as shown in FIG. 5C is detected. Then, a correction waveform in which the DF correction waveform 2 shown in FIG. 5D and the PF correction waveform 3 are added is formed by superimposing this detection signal (peak focus (PF) correction waveform 3) upon the dynamic focus (DF) correction waveform shown in FIG. 5B, for example.

Accordingly, in the above-mentioned apparatus, the fluctuation of the high-tension voltage is detected and the focusing voltage is corrected in response to the detected fluctuation of the high-tension voltage, whereby the fluctuation of the focusing voltage following the fluctuation of the high-tension voltage may be obtained. Thus, the defocusing state of the beam spot on the focusing screen may be removed.

That is, in the above-mentioned apparatus, without improving the high-voltage regulation, it is possible to considerably improve the defocused state and the blooming caused in the white peak such as the window signal or the like. Incidentally, in the above-mentioned apparatus, since only the AC component of the high-voltage fluctuation is derived, the conventional correction waveform may be prevented from being affected thereby and there may be obtained the dynamic focusing characteristic which can follow the high-voltage fluctuation of the H/L to C/O.

Figure 6:
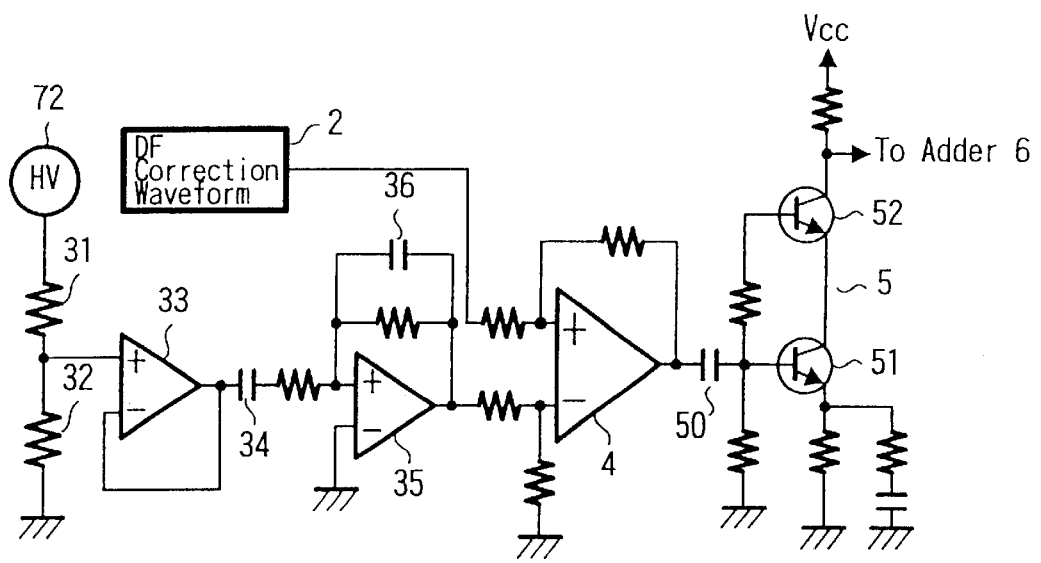
FIG. 6 is a schematic diagram showing an example of an arrangement of a main portion of the display device according to the present invention.

Further, FIG. 6 shows an example of a specific circuit in which the fluctuation of the above-mentioned high-tension voltage is detected and the correction signal which is to be added to the DC voltage 1 in the adder 6 shown in FIG. 4 is formed by superimposing this detection signal (peak focus (PF) correction waveform 3) upon the dynamic focus (DF) correction waveform 2.

As shown in FIG. 6, a high-tension voltage (HV) derived from one end 72 of the secondary winding of FIG. 2, for example, is voltage-divided by resistors 31, 32 and supplied to an impedance converter (IC) 33. The high-tension voltage (HV) thus impedance-converted is supplied through a DC-blocking capacitor 34 to an inverting amplifier (IC) 35, in which a correction amount is adjusted and a phase is adjusted by capacitors 34, 36. Thus, there is generated a peak focus (PF) correction waveform whose correction amount and phase were adjusted.

This peak focus (PF) correction waveform and the dynamic focus (DF) correction waveform 2 are supplied to the above-mentioned adder (IC) 4. Then, an added signal from the adder 4 is supplied through a DC-blocking capacitor 50 to transistors 51, 52 which are connected in cascade to comprise the above-mentioned amplifier 5. In this manner, there is formed the correction signal that is to be added to the DC voltage 1 in the above-mentioned adder 6.

Accordingly, in this circuit, the fluctuation of the high-tension voltage is detected and the focusing voltage is corrected in response to the detected fluctuation of the high-tension voltage, whereby the fluctuation of the focusing voltage following the fluctuation of the high-tension voltage may be obtained. Thus, the defocusing state of the beam spot on the focusing screen may be removed.

Figure 7:
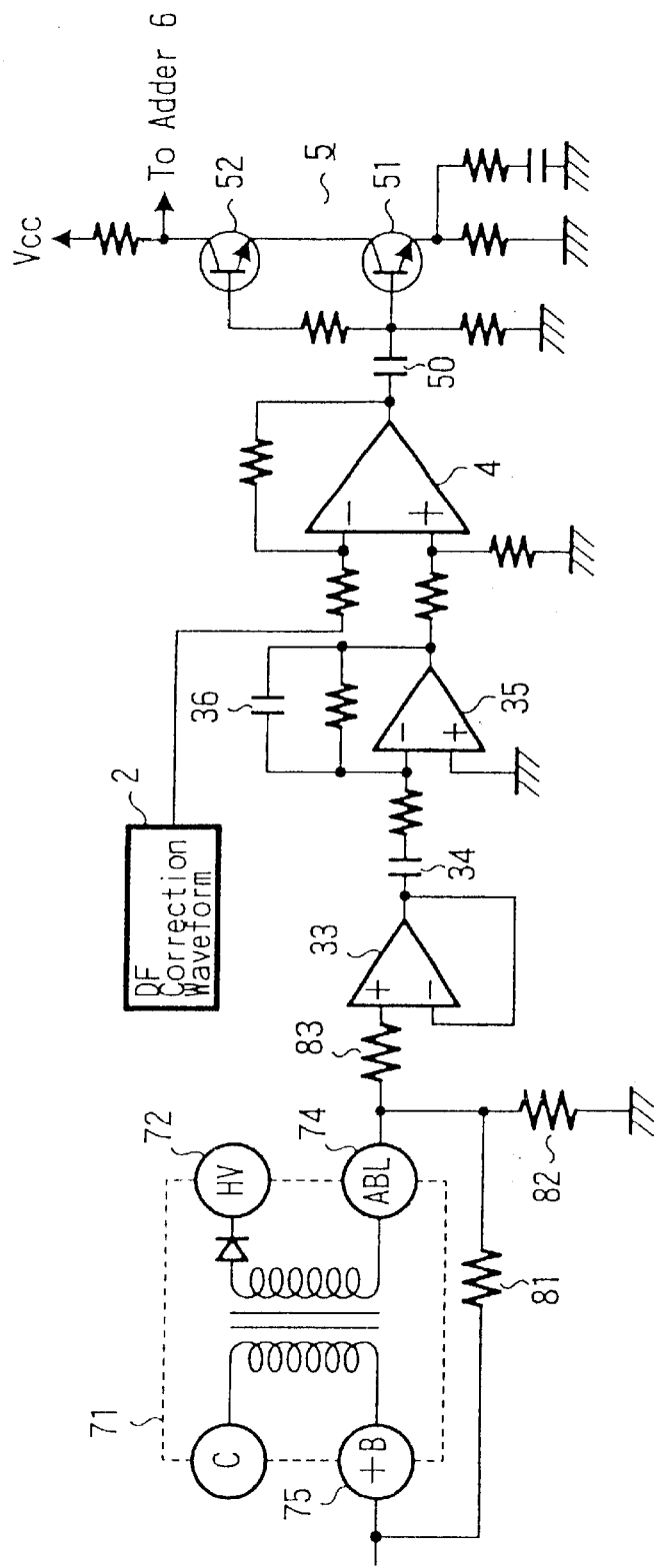
FIG. 7 is a schematic diagram showing an arrangement of other example of a main portion of the display device according to the present invention.

FIG. 7 shows an example of a practical circuit which generates a correction signal to be added to the DC voltage 1 in the adder 6 shown in FIG. 4 in such a manner that the fluctuation of the high-tension voltage mentioned above is detected, and this detection signal (peak focus (PF) correction waveform 3) is superimposed on the dymanamie focus (DF) correction waveform 2.

That is, in FIG. 7, a so-called ABL voltage derived from the other end 74 of the secondary winding of FIG. 2 mentioned before and a +b voltage applied to a power supply end 75 of a primary winding are mixed in resistors 81, 82 and 83, whereby the fluctuation equivalent to the fluctuation of the above-mentioned high-tension voltage (HV) can be derived. Then, the signal thus derived is supplied to the impedance converter (IC) 33, mentioned before, and then processed similar to the manner described in connection with FIG. 6, whereby the correction signal to be added in the adder 6 can be generated.

Accordingly, in this circuit, also the fluctuation of the high-tension voltage is detected and the focusing voltage is corrected in response to the detected fluctuation of the high-tension voltage, whereby the fluctuation of the focusing voltage following the fluctuation of the high-tension voltage may be obtained. Thus, the defocusing state of the beam spot on the focusing screen may be removed.

Figure 8:
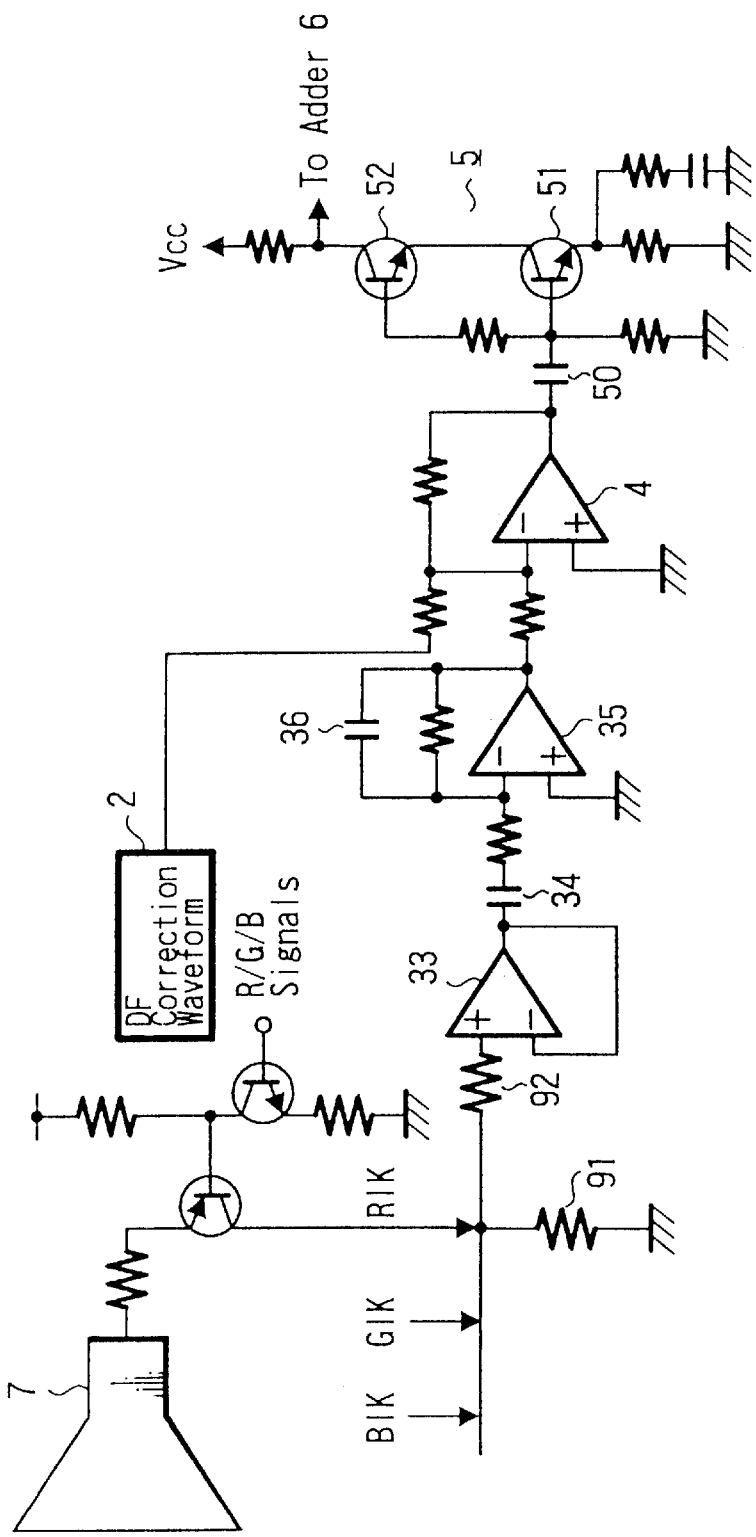
FIG. 8 is a schematic diagram showing an arrangement of a further example of a main portion of the display device according to the present invention.

Furthermore, the fluctuation of the above-mentioned high-tension voltage is inherently caused by a video signal to be displayed. Therefore, in the example of the invention shown in FIG. 8, cathode-currents RIK, GIK, BIK of three primary color video signals (R/G/B) to be applied to the cathodes of the cathode-ray tube 7 are added and converted into a voltage by a resistor 91. This voltage is applied through a resistor 92 to the above-mentioned impedance converter (IC) 33. Thus, by a similar processing mentioned above, it is possible to form the correction signal which is to be added by the above-mentioned adder 6.

Therefore, according to this circuit, also the fluctuation of the high-tension voltage is detected and the focusing voltage is corrected in response to the detected fluctuation of the high-tension voltage, whereby the fluctuation of the focusing voltage following the fluctuation of the high-tension voltage may be obtained. Thus, the defocusing state of the beam spot on the focusing screen may be removed.

As described above, according to the above-mentioned display device, there is provided the display device using the cathode-ray tube to perform a display. This display device includes the control means for controlling the focusing voltage in response to the position of the beam spot on the tubular surface or screen of the cathode-ray tube and the correction means for detecting the fluctuation of the high-tension voltage applied to the cathode-ray tube and correcting the focusing voltage in response to the detected fluctuation of the high-tension voltage, whereby the fluctuation of the focusing voltage following the fluctuation of the high-tension voltage may be obtained and the defocusing state of the beam spot on the focusing screen may be removed.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. A display device using a cathode-ray tube to carry out a display comprising:
    a control means for controlling a focusing voltage in response to a position of a beam spot on a screen or tubular surface of said cathode-ray tube; and
    a correction means for detecting a fluctuation of a high-tension voltage applied to said cathode-ray tube and correcting said focusing voltage in response to a detected fluctuation of said high-tension voltage, wherein said correction means detects and phase shifts an AC component of said fluctuation of said high-tension voltage, resulting in a peak focus correction wave form.

2. A display device as claimed in claim 1, characterized in that a detection of the fluctuation of said high-tension voltage is carried out by voltage-dividing said high-tension voltage with a resistor.

3. A display device as claimed in claim 1, characterized in that a detection of the fluctuation of said high-tension voltage is carried out by detecting a potential at other end of a transformer winding which generates said high-tension voltage.

4. A display device as claimed in claim 1, characterized in that a detection of the fluctuation of said high-tension voltage is carried out by detecting a cathode current of said cathode-ray tube.

5. A display device as claimed in claim 1, characterized in that when the fluctuation of said high-tension voltage is detected, only an AC component from the fluctuation of said high-tension voltage is derived.

6. A display device as claimed in claim 1, wherein said resulting peak focus correction wave form is added to a dynamic focus correction waveform, resulting in a sum waveform.

7. A display device as claimed in claim 6, wherein said sum waveform is amplified by an amplifier and added to a dc voltage to drive a cathode-ray tube.

8. A display device using a cathode-ray tube to carry out a display comprising:
    a control circuit which controls a focusing voltage in response to a position of a beam spot on a screen or tubular surface of said cathode-ray tube; and
    a correction circuit which detects a fluctuation of a high-tension voltage applied to said cathode-ray tube and corrects said focusing voltage in response to a detected fluctuation of said high-tension voltage;
    wherein said correction circuit comprises a dc-blocking capacitor to derive an AC component of said fluctuation of said high-tension voltage.

9. A display device as claimed in claim 8, wherein detection of said fluctuation of said high-tension voltage is carried out by voltage-dividing said high-tension voltage with a resistor.

10. A display device as claimed in claim 8, wherein detection of said fluctuation of said high-tension voltage is carried out by detecting a potential at other end of a transformer winding which generates said high-tension voltage.

11. A display device as claimed in claim 8, wherein detection of said fluctuation of said high-tension voltage is carried out by detecting a cathode current of said cathode-ray tube.

* * * * *